(12) United States Patent
Davies et al.

(10) Patent No.: US 8,632,098 B2
(45) Date of Patent: Jan. 21, 2014

(54) IMPROVEMENTS RELATING TO STEERING ASSEMBLIES

(75) Inventors: Niclas Davies, West Glamorgan (GB); Patrick Anthony Duffy, Stourport on Severn (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 13/514,674

(22) PCT Filed: Dec. 6, 2010

(86) PCT No.: PCT/GB2010/052034
§ 371 (c)(1),
(2), (4) Date: Oct. 29, 2012

(87) PCT Pub. No.: WO2011/070348
PCT Pub. Date: Jun. 16, 2011

(65) Prior Publication Data
US 2013/0042716 A1   Feb. 21, 2013

(30) Foreign Application Priority Data

Dec. 11, 2009 (GB) .................................. 0921713.4
May 26, 2010 (GB) .................................. 1008802.9

(51) Int. Cl.
*B62D 1/00* (2006.01)
(52) U.S. Cl.
USPC ....................................................... 280/777
(58) Field of Classification Search
USPC .................... 280/777, 775; 74/493
See application file for complete search history.

(56) References Cited

U.S. PATENT DOCUMENTS

| 5,562,307 | A | 10/1996 | Connor |
| 6,942,250 | B2 * | 9/2005 | Dubay et al. ................... 280/777 |
| 7,219,927 | B2 * | 5/2007 | Lee ................................ 280/777 |
| 7,914,044 | B2 * | 3/2011 | Park .............................. 280/777 |
| 8,167,502 | B2 | 5/2012 | Davies et al. |

(Continued)

FOREIGN PATENT DOCUMENTS

| GB | 2291840 A | 2/1996 |
| GB | 2454345 A | 5/2009 |

(Continued)

OTHER PUBLICATIONS

International Search Report, Application No. PCT/GB2010/052034, Dated Apr. 4, 2011.

*Primary Examiner* — Faye M. Fleming
(74) *Attorney, Agent, or Firm* — MacMillan, Sobanski & Todd, LLC

(57) ABSTRACT

An adjustable steering column assembly includes a first shroud portion comprising an outer tube, a second shroud portion which comprises an inner tube, and a clamp mechanism that includes a part that is fixed relative to the outer tube, the first and second shroud portions being releasably engaged by the clamp mechanism to selectively permit an amount of relative movement between the first and second shroud portions that is required during adjustment of the steering column assembly, the assembly further including an energy absorbing member which includes a strap that interconnects the inner tube and the part of the clamp bolt assembly, the assembly being so arranged that upon collapse the inner tube moves relative to the clamp assembly whereupon the energy absorbing member is deformed beyond its elastic limit, thereby absorbing energy in the system to control the collapse of the assembly.

29 Claims, 10 Drawing Sheets

(56) References Cited

U.S. PATENT DOCUMENTS

| | | | |
|---|---|---|---|
| 8,438,944 B2* | 5/2013 | Ridgway et al. | 74/493 |
| 2007/0013180 A1 | 1/2007 | Stuedemann et al. | |
| 2008/0023952 A1* | 1/2008 | Manwaring et al. | 280/777 |

FOREIGN PATENT DOCUMENTS

| | | |
|---|---|---|
| JP | 8295251 A | 11/1996 |
| WO | 03035452 A1 | 5/2003 |
| WO | 2007110054 A2 | 10/2007 |

\* cited by examiner

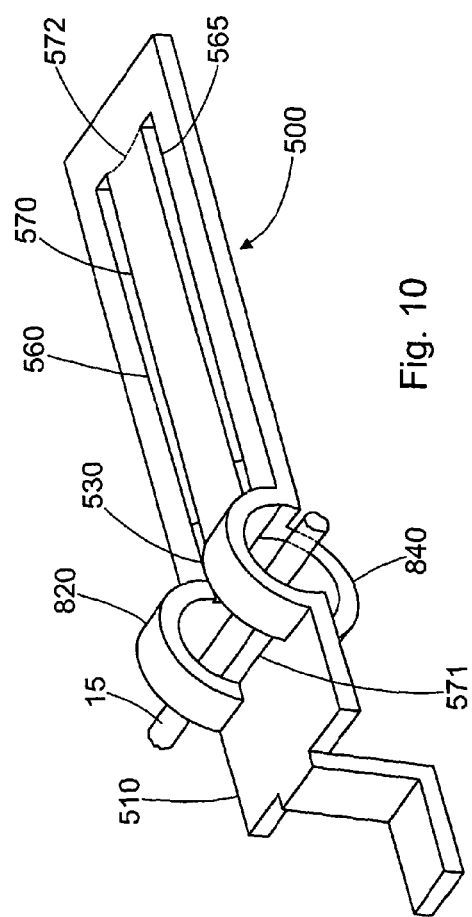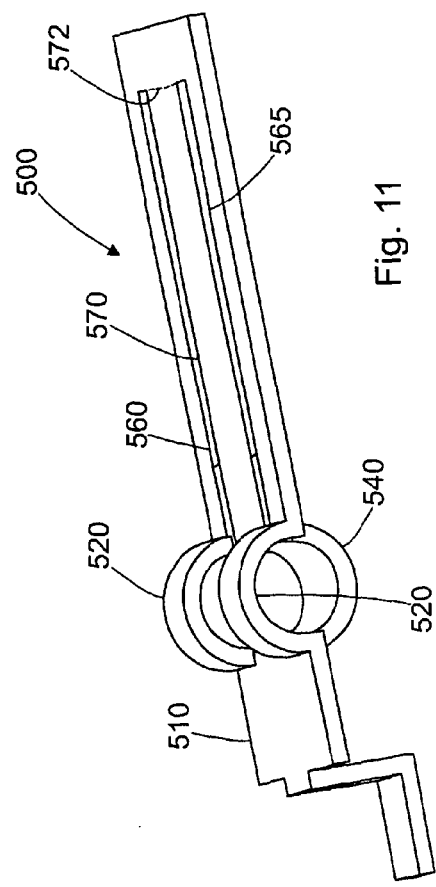

IMPROVEMENTS RELATING TO STEERING ASSEMBLIES

CROSS-REFERENCE TO RELATED APPLICATIONS

This application is a national stage of International Application No. PCT/GB2010/052034 filed Dec. 6, 2010, the disclosures of which are incorporated herein by reference in entirety, and which claimed priority to Great Britain Patent Application No. GB 0921713.4 filed Dec. 11, 2009 and Great Britain Patent Application No. GB 1008802.9 filed May 26, 2010, the disclosures of which are incorporated herein by reference in entirety.

BACKGROUND OF THE INVENTION

The invention relates to adjustable steering column assemblies of the kind which include a first shroud portion, a second shroud portion and a clamp mechanism that includes a bracket secured to a fixed part of a vehicle and in which the first and second portions are releasably engaged by the clamp mechanism to selectively permit an amount of relative movement between the first and second portions that is required during adjustment of the steering column assembly.

Steering column assemblies are known which include a clamp mechanism that relies solely on friction when locked to prevent unwanted movement of the first and second parts of a steering column assembly. The clamp mechanism can be unlocked and locked by movement of a locking lever or, sometimes, electrically using a motor or perhaps hydraulically or pneumatically.

By releasing the clamp mechanism and telescopically sliding the first portion over the second portion the length of the shroud can be altered, altering the reach position of an associated steering wheel. By moving both portions together up and down relative to the clamp mechanism the rake can be adjusted. In some assemblies only one of reach and rake may be adjusted.

The clamp mechanism may be attached to a bracket (known as a Rake Bracket) which is connected to the vehicle through one or more frangible fasteners. In the event of a crash causing a high load to be applied to the wheel the fasteners can sever allowing the bracket and the clamp mechanism to move relative to the vehicle, in turn allowing whichever part of the shroud it is secured to also to move so the wheel can collapse away from the driver.

To control the rate of collapse it is known to provide an energy absorbing device such as one or more straps which engages the vehicle body at one end and the bracket at the other. As the bracket moves relative to the vehicle it causes the strap to deform beyond its elastic limit and this deformation absorbs some of the energy, controlling the rate of collapse.

In a common arrangement, shown in FIG. 1 of the accompanying drawings, the energy absorbing device comprises two members which each comprise a strap 60, 61 anchored to two metal blocks (known as Capsules) which form the frangible connectors which enable the bracket to break away in crash and move forward in the vehicle under the impact of the driver's torso on the steering wheel and column upper structure. Note that the force of the impact is transferred from the column upper structure to the Rake Bracket by the Clamp Mechanism. The Capsules, which are usually positioned symmetrically on either side of the column centre-line, commonly each have a single vertical hole passing approximately through their centre through which a fixing bolt secures it to the vehicle structure.

Generally, the energy 60, 61 straps are threaded through additional blocks having labyrinthine apertures 70, 71 (sometimes called Anvils). The Anvils are fixed in the Rake Bracket and are situated ahead of the Capsules. When the Rake Bracket breaks away from the capsules, the Energy Straps are progressively dragged through the Anvils and deformed by them in the process. This causes a proportion of the impact energy to be absorbed more or less evenly over the collapse stroke of the column. The result is to reduce the peak force acting on the driver's torso. This arrangement is known to be efficient, cost effective and easy to tune by selecting the width, thickness and material properties of the Energy Straps.

However there are instances, especially if a column-mounted electrical power assistance system (known as an EPS) is fitted to the lower end of the column, where the area needed to accommodate the above described Energy Strap configuration in the top plate of the Rake Bracket means that the latter will clash with some parts of the EPS before the intended crash stroke can be completed

BRIEF SUMMARY OF THE INVENTION

It is a feature of the present invention to provide a steering column assembly including a clamp mechanism that includes a mechanism for absorbing crash energy that ameliorates the clash problem that is sometimes present in the prior art.

Accordingly, the invention provides an adjustable steering column assembly which includes a first shroud portion comprising an outer tube, a second shroud portion which comprises an inner tube, and a clamp mechanism that includes a part that is fixed relative to the outer tube, the first and second shroud portions being releasably engaged by the clamp mechanism to selectively permit an amount of relative movement between the first and second shroud portions that is required during adjustment of the steering column assembly, the assembly further including an energy absorbing member which includes a strap that interconnects the inner tube and the part of the clamp bolt assembly, the assembly being so arranged that upon collapse the inner tube moves relative to the clamp assembly whereupon the energy absorbing member is deformed beyond its elastic limit, thereby absorbing energy in the system to control the collapse of the assembly.

This arrangement enables a steering assembly with a reduced profile to be provided compared with the prior art, making the energy absorbing connection less likely to interfere with any surrounding objects, because the connection no longer needs to be made between the bracket and vehicle body as required in the prior art.

Preferably, the clamp assembly is fixed relative to the outer tube portion when the clamp assembly is both the clamped and the released condition. Retention of the Inner Column Tube in the Outer Column Tube is then ensured by the provision of the energy absorbing member which prevents the first shroud portion and second shroud portion of the column from sliding apart should the clamping lever be inadvertently moved to the "Unlock" position while the column assembly is being handled or transported inside the car factory.

Preferably the outer tube includes an axial slot which is so positioned that the clamp assembly when clamped may partially close the slot to squeeze the outer tube onto the inner tube, and the strap of the energy absorbing member may be at least partially located within this slot.

This has advantage of providing an especially low profile assembly as the strap can be accommodated within an otherwise unused area of space which would otherwise be occupied by the missing part of the outer tube.

The energy absorbing member may be located in the slot of the outer tube so that it abuts one edge of the slot. This enables the member to provide an anti-rotation function which involves restraining the Outer Column Tube from rotating slightly when the clamping is released. This matters mainly once the unit is installed in the vehicle. It is an unwanted characteristic of Split-Tube columns that a small rotation of the Outer Column Tube takes place as it unwraps itself from the Inner Column Tube and hence a small but visible rotation of the Column Switch stalks can be seen by the driver. This movement tends to take place in one rotation direction only and the upper column usually returns to its correct position when it is re-clamped. Provided that the energy absorbing member is secured to the Inner Tube precisely so that it contacts with one edge of the split in the Outer Tube this can prevent the said uni-directional rotation associated with releasing the clamp.

The clamp assembly may comprise a clamp bracket having two spaced arms, and a clamp bolt which passes through openings in each arm and the energy absorbing member may engage the bolt or a sleeve surrounding a part of the bolt. It may surround part of the bolt located between the arms of the bracket. This bolt is otherwise usually free of any other components and provides a convenient part for the energy absorbing member to engage. The bolt forms a fixed part of the clamp assembly onto which are threaded various other parts of the clamp assembly and whose function is to Clamp the column in the height and/or reach positions preferred by different drivers. The bolt may form the fixed part in so far as it cannot move along the axis of the outer tube when the clamp assembly is clamped.

The clamp bracket, sometimes called a rake bracket when the assembly can be adjusted for rake by moving the bolt along vertical slots in the bracket, may be fixed to a mounting bracket which may in turn be fixed to the vehicle body through releasable/breakable fastening.

The steering column assembly may be of the inverted-type, by which we mean that the inner tube may be fixed axially relative to the rake bracket during normal use whilst the outer tube moves telescopically to provide for reach adjustment of the assembly, the inner tube moving axially in the event of a crash.

The energy absorbing member may be directly in contact with the clamp bolt of the clamp bolt assembly. Alternatively it may be indirectly in contact with the clamp bolt which may be provided with a collar and the strap contacting the collar.

In one arrangement, the energy absorbing member may comprise a strap that connects the inner tube to the clamp bolt. The strap may be provided with a loop at one end which engages the clamp bolt, and may be secured to the inner tube at its other end. In use, during a crash the loop will be pulled by the clamp bolt causing the strap to deform and absorb energy.

The strap may comprise a central strip of metal which is provided with a loop at one end and which strap is joined to an outer frame at the end furthest from the loop. The strap may join the frame along its length by two weakening lines about which the central strip may be preferentially peeled from the frame.

The frame may be secured to the inner tube.

In an alternative, the energy absorbing member may comprise a strap that may be secured to the inner tube at the end which is closest to the steering wheel and the strap may be formed into a 360 degree loop with the centre of the loop coincident with the axis of the clamp bolt so that on collapse the clamp bolt moves away from the steering wheel so as to force the strap to curl and uncurl around the clamp bolt, moving the loop along the strap towards the end of the strap furthest from the steering wheel. In curling and curling the strap is deformed in two regions beyond its elastic limit (the region that is being curled around the bolt and the region that is uncurling as it is pulled off the bolt) and this deformation absorbs energy controlling collapse.

Alternatively, in the preceding arrangement the energy absorbing member may include a strap which may be secured to the inner tube at the end which is closest to the steering wheel. It may work in the same manner, with a looped region of the strap being wrapped around the clamp bolt and curling and uncurling as it is pulled around the clamp bolt during collapse.

This loop may be located at a position approximately halfway along the length of the energy absorbing member.

The strap may be curled around the bolt through more than one loop.

The bolt may be surrounded by a loosely fitting Sleeve which is located within the loop and forms a support surface around which the strap is curled of greater diameter than the bolt.

It is not essential that the other end of the member is secured to the inner tube, although it may be done in order to prevent it from vibrating during normal operation of the vehicle.

Where both ends are secured to the inner tube, the clamping assembly should engage the member at a point between the two ends and preferably closer to the end nearest the wheel. It should, preferably, the located far enough from the other end of the member to allow for the required collapse travel of the steering assembly shrouds.

Where the strap is fixed to the inner tube at its end furthest from the steering wheel, a small shape can be formed into the strap such as a hump or a double bend close to the weld. This will provide an amount of lengthwise plastic compliance and minimize tension in the strap that might otherwise arise, due to geometrical effects, as the column collapses in crash.

In an alternative arrangement, the strap comprises a central strip of metal which is joined to an outer frame by two weakening lines about which the central strip may be preferentially peeled from the frame, the frame being secured to the clamp assembly and the strip being secured to the inner tube.

With this embodiment, energy is absorbed, in a controlled way, when the central portion is separated from the outer frame by a peeling action which causes tearing along the weakening lines.

The outer frame portion of the Energy Strap may be secured to the clamp bolt, where provided. It may include two downward folded tabs at its end which is furthest from the driver, each having a hole which is large enough to allow the clamp bolt to pass through.

The weakening lines may comprise regions of substantially reduced thickness relative to the central portion, perhaps formed by a grooving operation. Alternatively the lines may comprise a line of spaced perforations. A combination of reduced thickness and perforations may be provided.

The strap may comprise a metal strap. It may be an integral part of the inner tube. For instance, a cut out may be formed in the inner tube wall to define a tab, and the tab may be folded out of the plane of the inner tube wall to define the strap. In a crash this strap may cause a portion of the remaining wall of the inner tube to be torn away, absorbing energy.

The steering assembly may be adjustable for reach and/or rake.

The inner and outer tubes may both have a generally circular, or elliptical, or a rectangular cross section.

In use the inner tube and clamp mechanism may be fixed axially in position relative to the vehicle, and the outer tube may move telescopically relative to the inner tube and clamp mechanism when adjusting the column for reach and when in a collapse in the event of a crash. The inner tube may move relative to the vehicle in a crash, but may also move with the outer tube relative to the vehicle to allow adjust for the rake of the column assembly. The inner tube may be normally restrained from moving axially during adjustment, so the change in reach of the steering is achieved by movement of the outer tube only. The outer tube may be the part closest to the steering wheel, the assembly providing a so called "inverted column type" steering column assembly.

According to a second aspect the invention provides an adjustable steering column assembly which includes a first shroud portion comprising an outer tube, a second shroud portion which comprises an inner tube, and a clamp mechanism that includes a part that is fixed relative to the outer tube, the first and second shroud portions being releasably engaged by the clamp mechanism to selectively permit an amount of relative movement between the first and second shroud portions that is required during adjustment of the steering column assembly, the assembly further including a strap that interconnects the inner tube and the part of the clamp bolt assembly, the assembly being so arranged that upon collapse the inner tube moves relative to the clamp assembly whereupon the strap causes a portion of the inner tube to be torn away, thereby absorbing energy in the system to control the collapse of the assembly.

In this aspect of the invention, the strap part may itself not deform elastically, merely serving to tear away part of the inner tube. It is the deformation of the torn part of the tube beyond its elastic limit that absorbs energy, including the tearing of the tube itself.

The strap may comprise an integral part of the inner tube, for instance it may be formed by making a cutout in the inner tube wall to define a tab which is folded back out of the plane of the inner tube. In an alternative the strap could be fixed to the inner tube by a weld or rivet or the like.

The feature of this second aspect may be combined with any of the features of the first aspect of the invention.

Other advantages of this invention will become apparent to those skilled in the art from the following detailed description of the preferred embodiments, when read in light of the accompanying drawings.

BRIEF DESCRIPTION OF THE DRAWINGS

FIGS. 10 and 11 are alternate views of a further alternative energy absorbing member which may be used in an embodiment according to a the present invention;

DETAILED DESCRIPTION OF THE INVENTION

Figure 1:
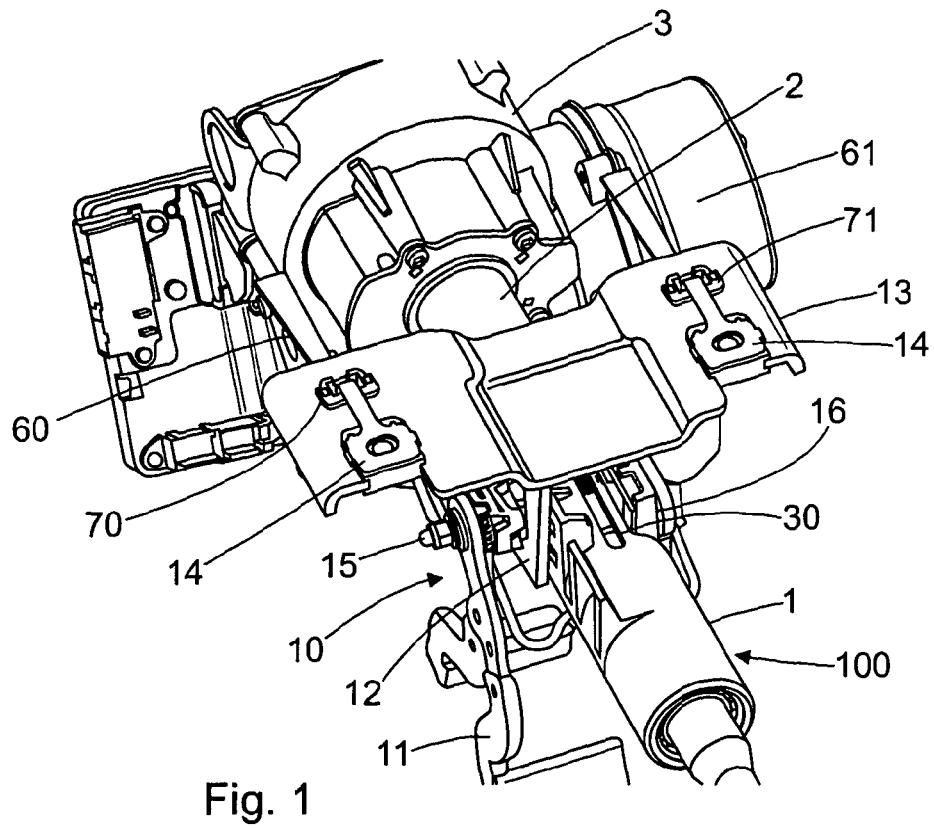
FIG. 1 is an isometric view of a prior art steering column assembly.

FIGS. 2 to 15 of the accompanying drawings show various embodiments of the invention applied to a so-called double-adjustment type steering column assembly 100, 200, 300. Such columns can be adjusted for both reach (in and out) and rake angle (up and down). The invention could, equally, apply to single adjust columns and non-adjust columns. The column assembly comprises a first shroud portion 1 and a second shroud portion 2 which can telescope relative to one another to allow for reach adjustment and which can both be moved in an arc around a pivot point axis to allow for rake adjustment. The telescoping mechanism allows the adjustment of the Reach position by the driver and also allows the first shroud portion to move forward in a controlled manner in the event of the steering wheel (not shown) being impacted by the driver in a crash.

The first shroud portion 1, being closest to the steering wheel, comprises an outer tube which supports the steering wheel shaft 1 via a ball bearing. The second shroud portion 2, closer to the power assistance motor, comprises an inner tube over which the outer tube is free to slide telescopically. There may be a special bushing (not shown) between the connecting diameters of these Shrouds to minimise the sliding friction.

The inner and outer tubes 1, 2 are fixed in position by a releasable clamp assembly 10 which is operated by a locking lever 11 that can be gripped by a driver. In a disengaged (unlocked, unclamped) position the outer tube 1 is free to move telescopically through the reach adjustment stroke along the inner tube 2. When in the fully engaged (locked, clamped) position, the clamp assembly secures the outer tube 1 to a so called rake bracket 12 by a positive locking of inter-engaged teeth so the inner and outer tubes 1, 2 can no longer move telescopically. It is this telescopic sliding action that enables the axial, or "Reach", position of the steering wheel to be varied.

Figure 2:
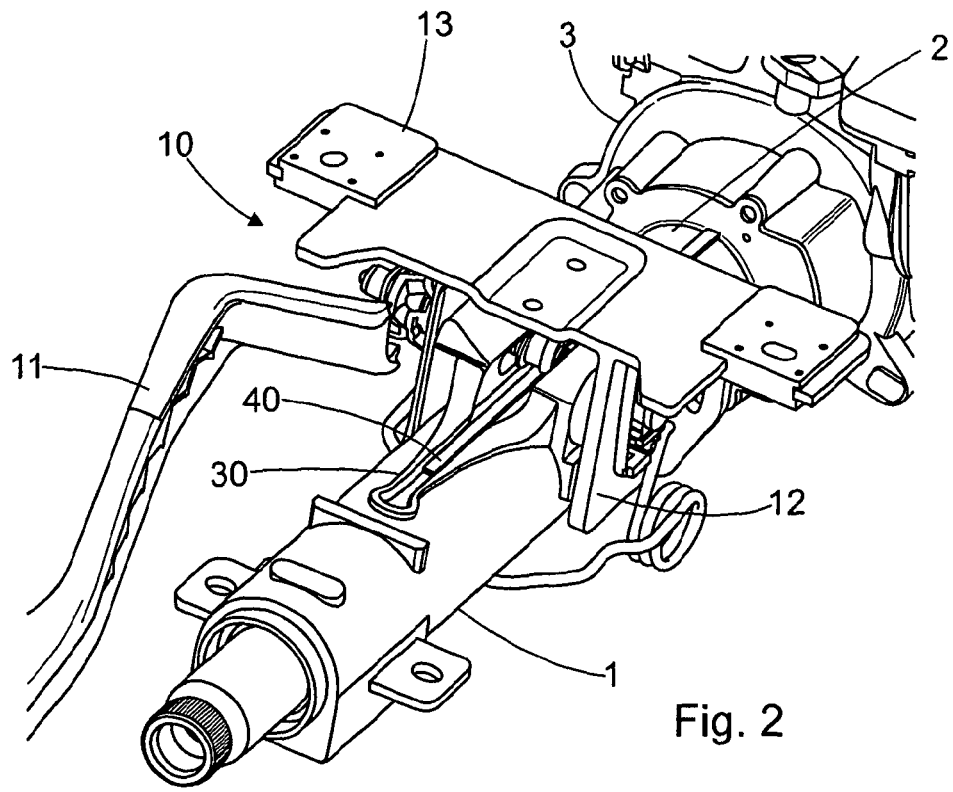
FIG. 2 is an isometric view of an embodiment of a steering column assembly which includes an energy absorbing member in accordance with the present invention.

The lower end of the inner tube 2 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering gearbox 3 which itself is pivoted to the vehicle structure at the Rake Pivot Axis. Such a gearbox 3 is shown in FIGS. 1 and 2.

The rake bracket 12 is secured to the vehicle. The bracket comprises an inverted U-shaped bracket which has two arms which extend downwards on either side of the shroud in the region where the inner and outer tubes 1, 2 overlap. This bracket 12 helps to prevent the steering column from moving side to side under load. In the locked position, the clamp assembly locks the inner and outer tubes 1, 2 in position between the arms of this bracket to prevent rake being altered.

The Rake Bracket 12 is fixed to a Mounting Bracket 13, which in turn is secured in two places to a part of the vehicle body. In the event of a crash, additional fusible connections, acting between the Mounting Bracket 13 and the vehicle body, are severed by the impact force of the driver striking the steering wheel. The Rake bracket 12 then slides forwards relative to the vehicle body. During this sliding process, the steering wheel is maintained in a substantially linear path by the combination of the telescoping of Shrouds 1 and 2.

The clamping mechanism is designed so that the one lever 11 simultaneously releases or locks the first portion (the upper shroud) to the second and third portions (lower shroud portion and rake bracket) in respect of both the Rake and the Reach directions. The clamping system comprises a clamp bolt 15, which passes through a slot in each arm of the fixed Rake Bracket (which as mentioned previously is attached via the Mounting Bracket to the vehicle structure) and a slot in each side of a fixed rack portion, in this example a reach bracket 16, which is attached to the outer tube 1. An adjusting nut is provided at one end of the bolt and a cap at the other. Although not essential in all envisaged embodiments, it is also useful to prevent rotation of the clamp bolt 15 in order to set the adjusting nut during manufacture, without the need to temporarily clasp the clamp bolt 15.

A cam mechanism is located on the clamp bolt 15 between the nut and the outer face of one of the arms of the rake bracket 12. The cam mechanism comprises a pair of face-cams, one of which is prevented from rotating while the other is attached to a clamp lever 11. The length of the cam mechanism (along the axis of the bolt) can be adjusted by rotation of the lever 11. The moving cam part of the cam mechanism abuts a thrust bearing which in turn abuts the adjusting nut which is screwed onto the threaded end of the clamp bolt 15. As the cam assembly lengthens when the lever is rotated to a locked position, it applies tension to the clamp bolt, drawing the cap towards the nut and so squeezing the arms of the rake bracket onto the sides of the reach bracket.

The outer tube 1 includes an elongate slot 30 in a position which passes between the arms of the bracket 12 so that as the arms are squeezed together the slot 30 tends to at least partially close. This clamps the outer tube 1 onto the inner tube 2 and helps prevent relative movement of the inner and outer tubes, fixing the length of the steering assembly. Some form of positive locking may also be provided as required, such as rows of locking teeth as is known in the art.

The slot 30 provides access to the inner tube and an energy absorbing member 40 is provided which is secured, by welding, to the inner tube, and fits around the clamp bolt approximately midway between the arms of the clamp bracket. The member is located, at least partly, in the slot 12. The function of the member is to deform inelastically during a collapse of the steering column such as when a driver impacts the steering wheel during an accident, the deformation controlling the energy of the collapse. This makes good use of otherwise wasted space in the assembly and keeps the energy absorbing part of the steering assembly out of the way of any other components located around the steering assembly.

Figure 12:
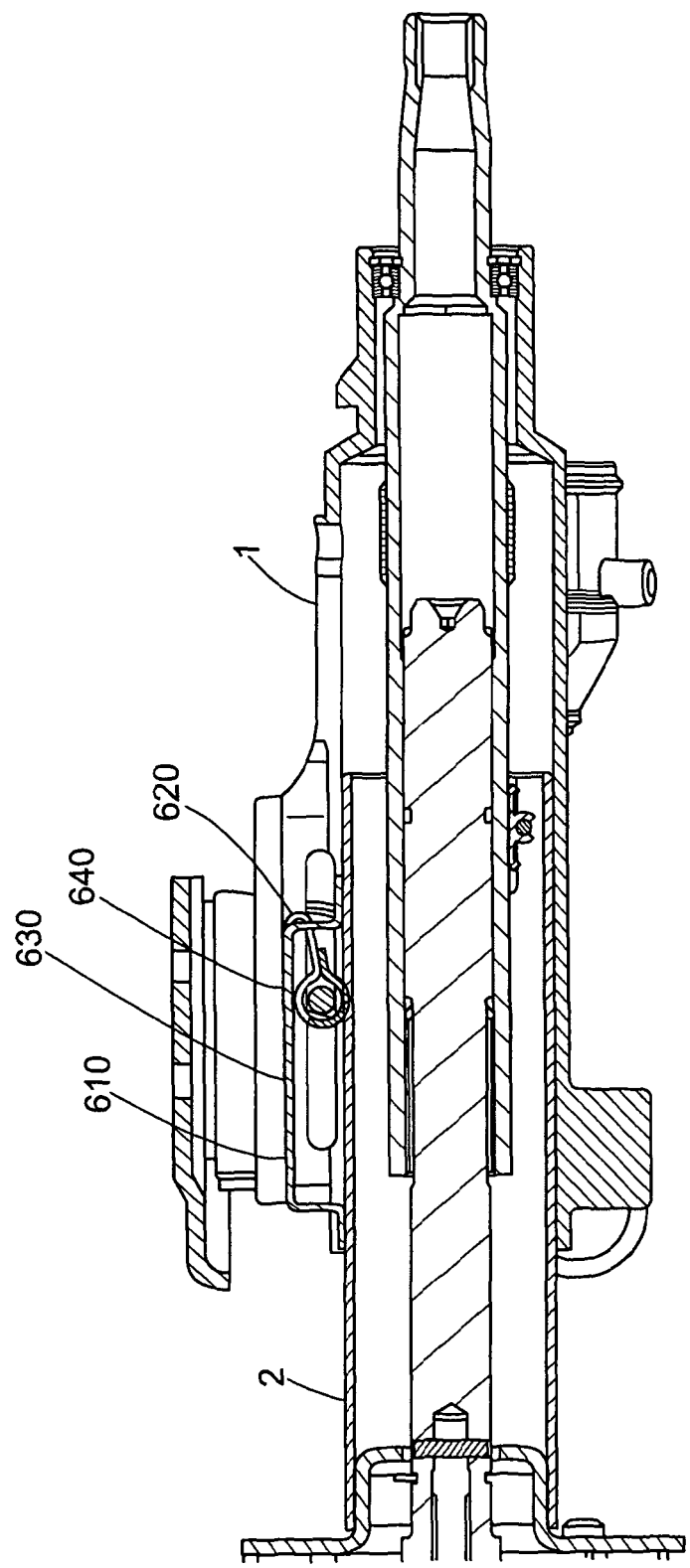
FIG. 12 is an isometric view of a still further embodiment of a steering assembly in accordance with the invention.
Figure 13:
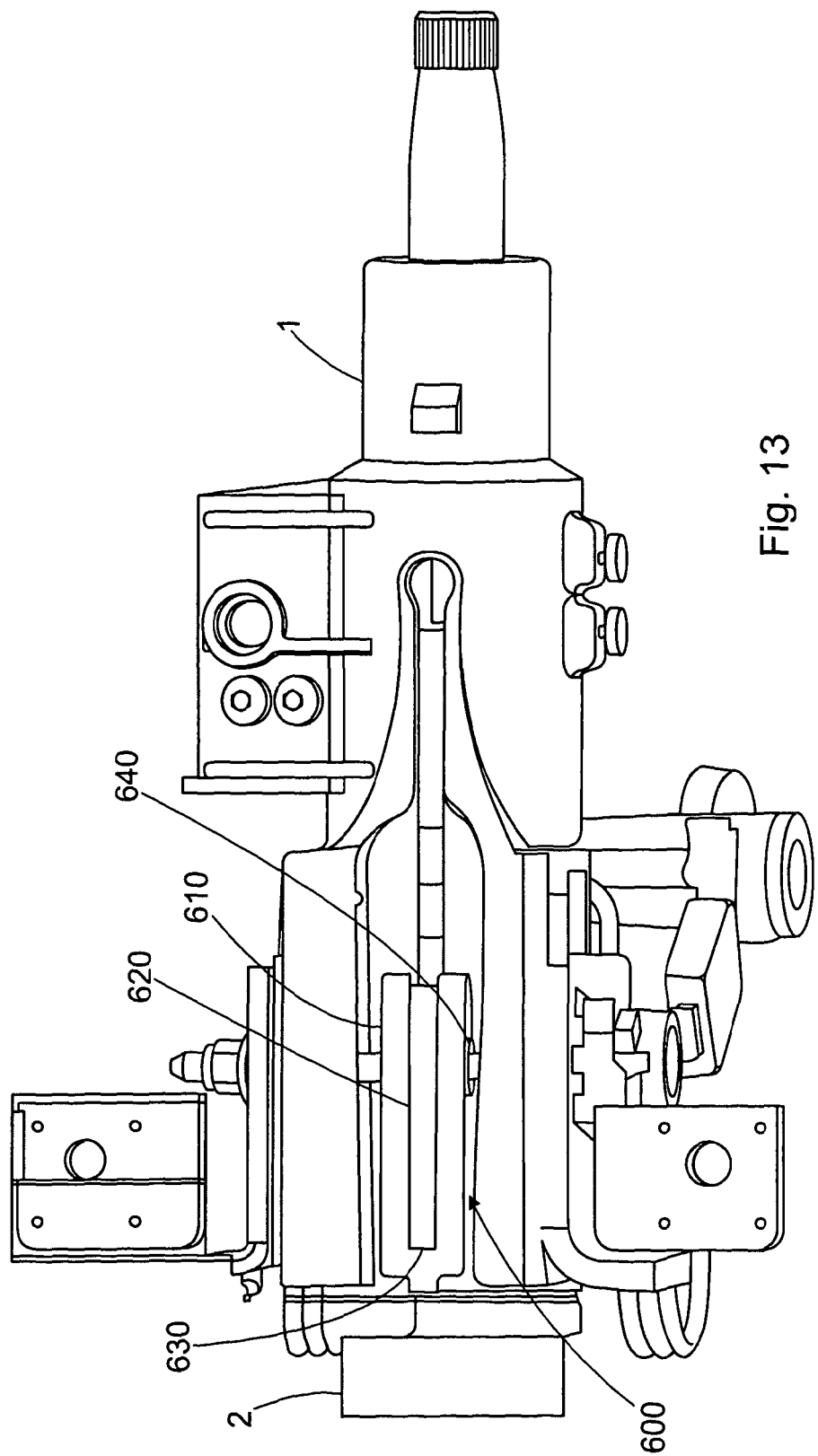
FIG. 13 is a view in elevation of the embodiment of FIG. 12.

A first arrangement of an energy absorbing member 40 is shown in FIGS. 2 to 5, FIGS. 7 to 9 show a second 50, FIGS. 10 and 11 a third, and FIGS. 12 and 13 a fourth arrangement, all four being embodiments in accordance with the present invention.

In FIG. 2, the energy absorbing member 40 comprises an elongate strap which is installed centrally in the slot 12. The strap 40 is anchored, for example by welding, to the inner tube at the end 41 which is closest to the steering wheel. It is not crucial to anchor the other end 42 of the strap 40 to the inner tube 2 but it may be judicious to do so in order to prevent is from vibrating during normal operation of the vehicle. At a position approximately halfway along its length, the strap 40 is formed into a 360 degree loop 43. The centre of the loop 43 is coincident with the axis of the so-called clamp bolt 15. As shown in the example, this area of the bolt may be surrounded by a loosely fitting Sleeve 44 which, for feasibility of assembly, is inserted into the loop 43 of the strap prior 40 to the welded assembly comprising the strap and inner tube being assembled to the rake bracket. The sleeve 43 has two functions: the first is to allow a more optimal (i.e. larger) loop diameter than would be provided by having a close fit around the bolt itself and the second is to reduce sliding friction between the strap 40 and the clamp bolt 15. The reduction in friction will generally ensure a more consistent behaviour in crash.

Figure 3:
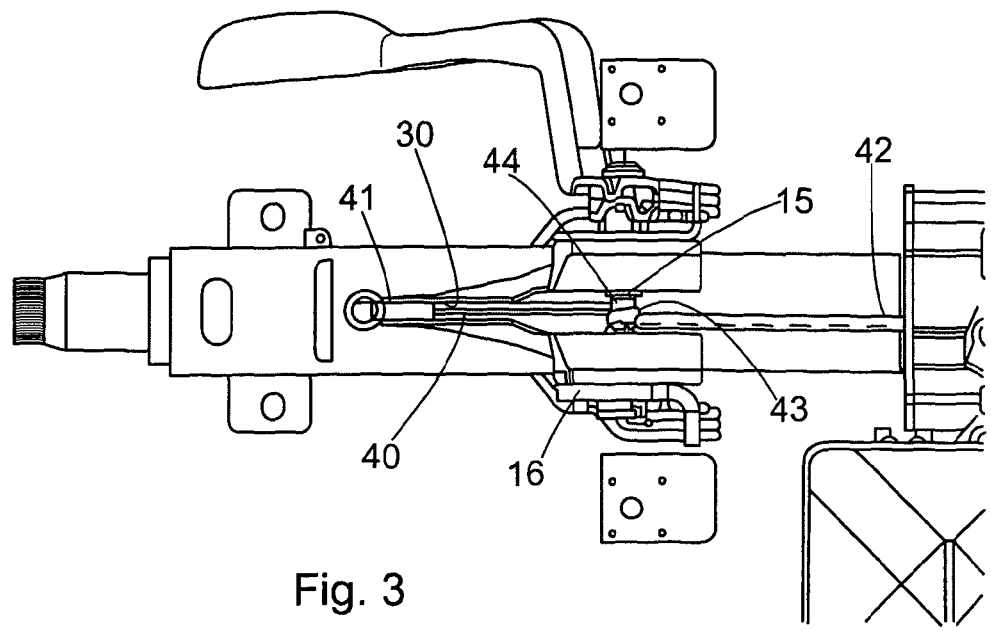
FIG. 3 is a view in plan of the assembly of FIG. 2 prior to collapse.
Figure 4:
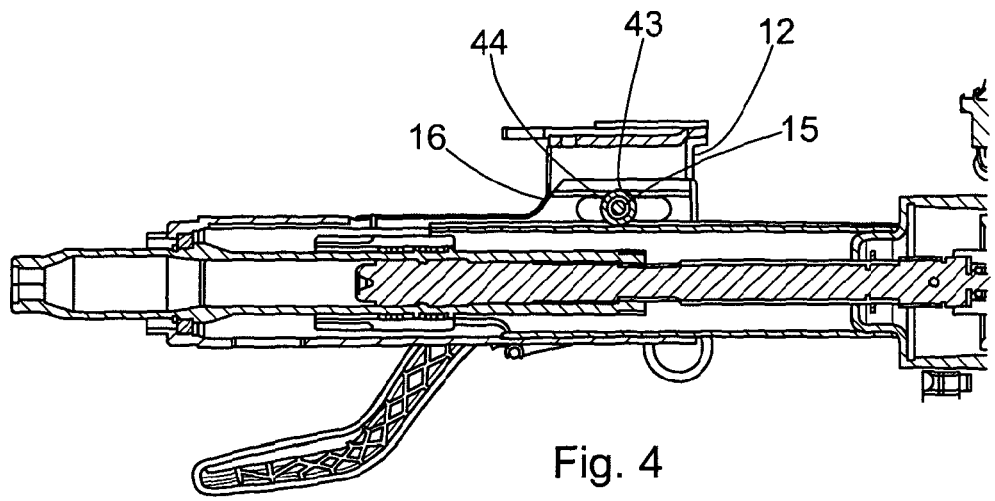
FIG. 4 is a view in elevation of the assembly of FIG. 2 prior to collapse.
Figure 5:
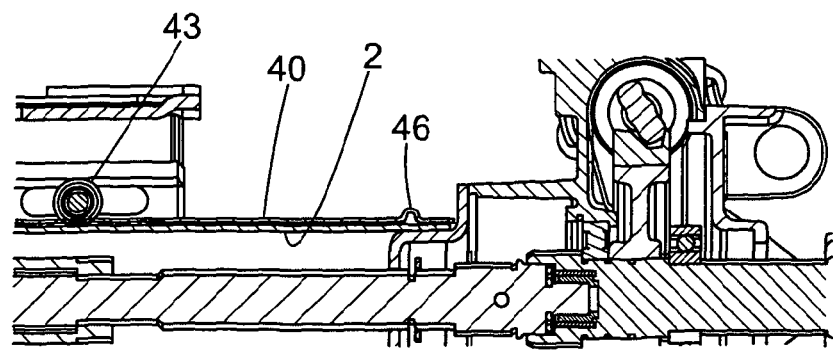
FIG. 5 is a view in elevation of a detail of the assembly of FIG. 2.
Figure 6:
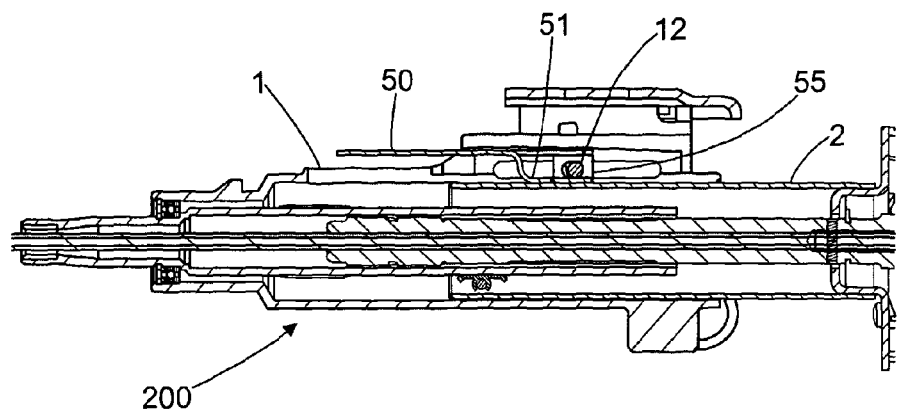
FIG. 6 is a view in elevation of a second embodiment of a steering assembly according to the present invention which includes an alternative energy absorbing member prior to a collapse.
Figure 7:
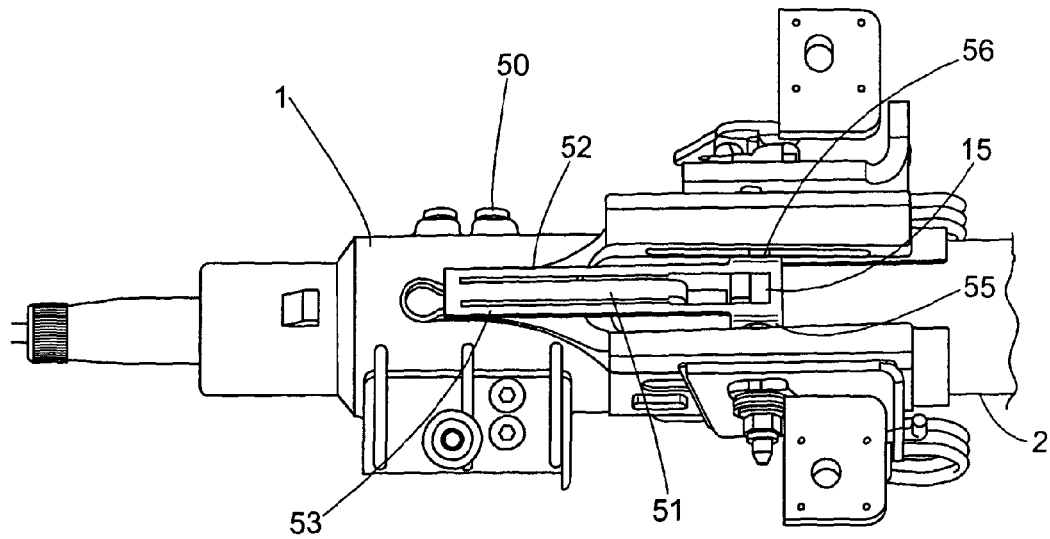
FIG. 7 is an isometric view of the steering assembly of FIG. 6.
Figure 8:
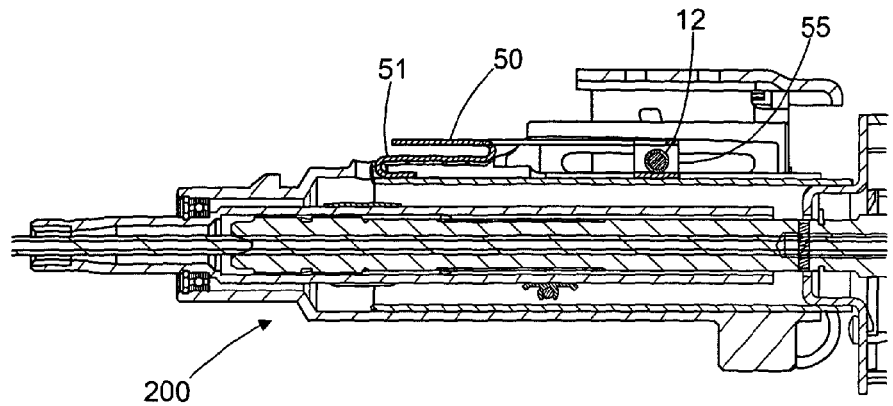
FIG. 8 is a view in elevation of the second embodiment of a steering assembly of FIGS. 6 and 7 after a collapse.
Figure 9:
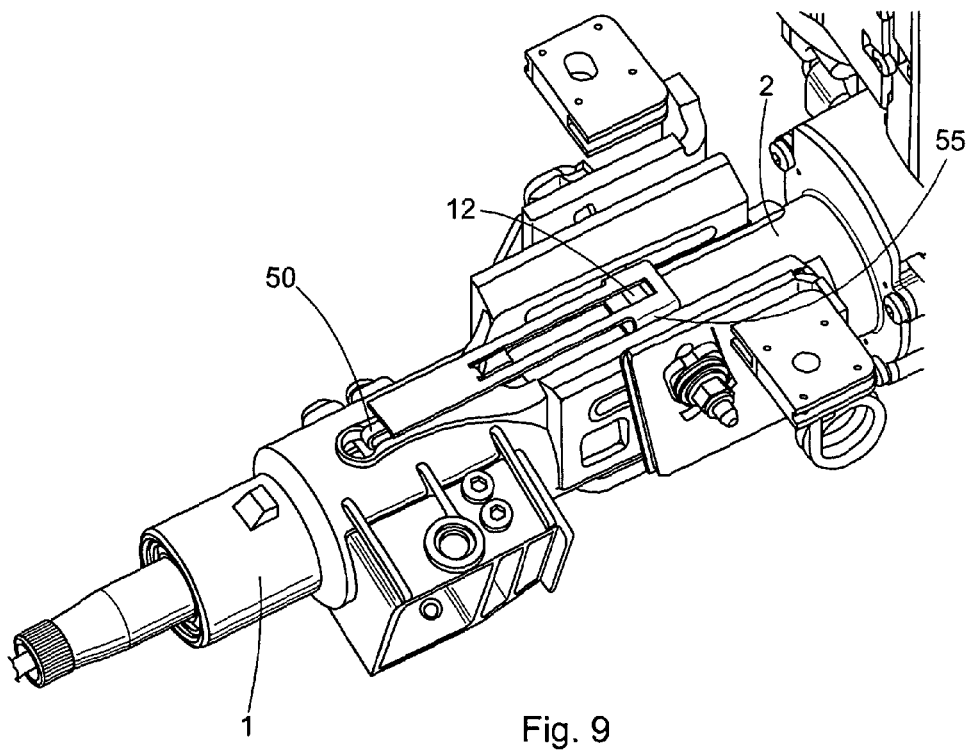
FIG. 9 is an isometric view of the steering assembly of FIG. 6 after a collapse which has torn away the strap of the energy absorbing member.

In a crash impact, the rake bracket 12 breaks free of the mounting bracket and is forced to move with the outer tube 1 relative to the inner tube 2 which remains fixed in position. The clamp bolt 15, which is located in vertical slots in either side plate of the rake bracket 12 that permit rake adjustment, is the main forcing element. Therefore the bolt 15 is moving with the Rake Bracket. The inner tube 2, and hence the anchored end(s) of the Energy Strap 40, remain stationary. Therefore, in crash, the loop in the energy strap is forced to "travel" along the strap causing successive portions to be progressively curled and uncurled. The deformations in the Energy Strap are sufficient to cause its elastic strain limit to be exceeded and therefore net energy is absorbed by this process. FIG. 3 shows the location of the loop prior to a collapse.

The lower end 42 of the Energy Strap 40 is welded to the Inner Tube 2 to prevent it from vibrating, and a small shape 46 is formed into the strap close to the weld. This can be seen in FIG. 5. This will provide an amount of lengthwise plastic compliance and minimise tension in the strap that might otherwise arise, due to geometrical effects, as the column collapses in crash. Such tension could create extra friction between the strap and the sleeve 44 and/or the sleeve and the clamp bolt 15 and therefore are detrimental to the consistency of the energy absorption action of the strap.

In an alternative arrangement shown in FIGS. 6 to 9 of the accompanying drawings, an energy absorbing member 50 is of the "Tear Strip" type in which a central strip of metal 51 is joined to an outer frame 52, 53 by two linear portions 54 of the parent metal which have been substantially reduced in thickness by a grooving operation. Energy is absorbed, in a controlled way, when the central portion 51 is separated from the outer frame 52, 53 by a peeling action which causes tearing along the grooves 54. The central portion 51 is anchored (for example by welding), at its end which is furthest from the driver to the inner tube 2. The outer frame portion 52, 53 of the energy absorbing member has two downward folded tabs 55, 56 at its end which is furthest from the driver, each having a hole which is large enough to allow the clamp bolt 15 to pass through.

In a crash impact, the rake bracket is forced forward. The clamp bolt 15, is located in vertical slots in either side plate of the rake bracket 12 and is the main forcing element. Therefore it is moving forwards with the rake bracket. The inner tube, and hence the anchored end of the central strip of the energy strap, remains stationary. The outer frame of the energy strap is forced to move forward with the clamp bolt and therefore the central portion is forced to separate from it by means of the said peeling action.

The energy absorbing member can be provided in many different shapes. Two further examples are shown in FIGS. 10 to 13 of the accompanying drawings. In the example of FIGS. 10 and 11, the member 500 is formed from a flat sheet which is punched and pressed, or otherwise deformed, into a shape which has a main body defining a continuous outer frame with a pair of spaced apart upper hinge part 520, 530, and an inner tongue 540 surrounded by the outer frame and forming a lower hinge part 550. The upper and lower hinge parts 520, 530, 550 are each C-shaped and together define a path through which the clamp bolt can be threaded. Two parallel weakening lines 560, 565 extend away from the hinge parts to define a tongue 570 which comprises a central tear strip portion. As such both ends 571, 572 of the tear strip 570 are therefore attached to the outer main body. In the event of a collapse, the clamp pin is driven out of the hinge section to tear the strip from the main body along the weakening lines.

In the example of FIGS. 12 and 13 a further alternative energy absorbing member 600 is provided. This also comprise a main frame 610 and a central tongue defining a tear strip 620 which is located within the main frame 610. It differs from the previous arrangements in that the tear strip is attached to the clamp bolt rather than the main body being attached to the clamp bolt. The free end 620 of the tear strip 610 is folded back towards the end 630 of the tear strip which is joined to the main frame and then wrapped around the clamp bolt 15 to form a loop 640, the end of which is welded closed. The part of the tongue which is wrapped around the clamp bolt therefore sits between the remainder of the tear strip and the outer tube. The main body 610 is welded in place at both ends onto the outer tube to enclose the clamp pin.

In addition to the primary function of the energy absorbing member, which is to provide a more compact means of energy absorption, the design can provide two other useful functions, namely Anti-Separation and Anti-Rotation. This is achieved by both the disclosed embodiments.

The former function (Anti-Separation) prevents the upper and lower portions of the column from sliding apart should the clamping lever be inadvertently moved to the "Unlock" position while the column assembly is being handled or transported inside the car factory. Retention of the Inner Column Tube in the Outer Column Tube is ensured because the upper portion of the column incorporates the Clamp Bolt while the lower portion incorporates the Energy Strap, this being connected to the Clamp Bolt via its loop.

The latter function (Anti-Rotation) involves restraining the Outer Column Tube from rotating relative to the inner tube during assembly and handling prior to fitment to a vehicle.

The strap may also be used to prevent relative rotation of the inner and outer tube during adjustment of the assembly when in use. It is an unwanted characteristic of Split-Tube columns that a small rotation of the Outer Column Tube takes place as it unwraps itself from the Inner Column Tube and hence a small but visible rotation of the Column Switch stalks can be seen by the driver. Vehicle manufacturers occasionally raise this as an issue of perceived quality. This movement tends to take place in one rotation direction only and the upper column usually returns to its correct position when it is re-clamped. The upper end of the strap can be welded to the Inner Tube precisely so that one edge of the strap is in contact with one edge of the split in the Outer Tube. This will prevent the said uni-directional rotation associated with releasing the clamp.

Figure 14:
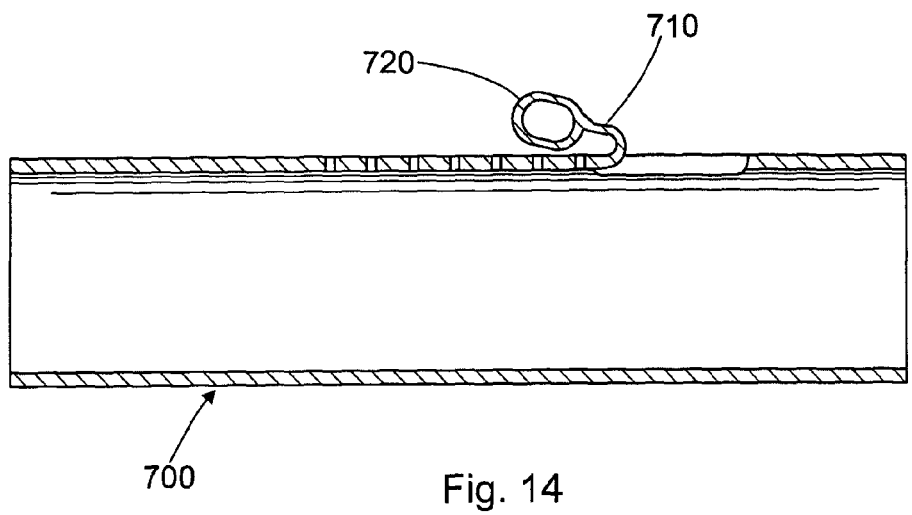
FIG. 14 is a view in plan and FIG. 15 is an isometric view of a still further embodiment of the present invention.
Figure 15:
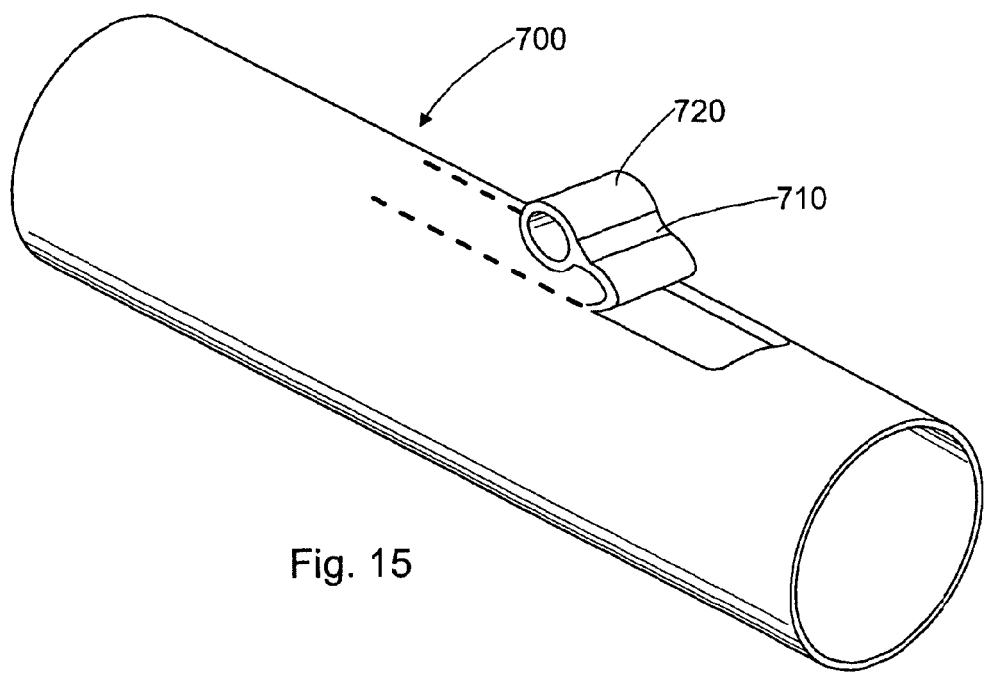

FIGS. 14 and 15 illustrate an alternative arrangement of the inner tube 700 which forms part of a split tube column assembly in accordance with the invention. This is functionally similar to the embodiment of FIG. 12 in so far as a strap 710 is provided which extends between the inner tube 700 and the clamp bolt (not shown), and which has at a free end a loop 720 through which the clamp bolt passes. In this example the strap 710 is an integral part of the inner tube and is formed by making a cut-out in the inner tube to define a tab which is folded back out of the plane of the inner tube to form the strap. A loop 720 is then welded onto the end of the strap, but it could be formed simply by folding the strap around on itself.

The inner tube 700 fits telescopically within an outer tube as per the preceding embodiments. A clamp mechanism, such as that shown in FIG. 1 is provided which in use clamps the inner and outer tube together and which includes the clamp bolt which passes through the loop.

In a crash the loop 720 moves away from the part where the strap joins the inner tube wall, and in so doing tears a strip of the inner tube (marked in FIG. 15 by dotted lines) away from the wall of the inner tube. The strap and the part of the inner tube which is torn away together define the energy absorbing member in this embodiment.

As can be seen in FIG. 15, two small radiused cutouts are formed on each side of the root of the strap where it is bent away from the inner tube wall. These encourage the inner tube to tear away in the desired manner.

Figure 18:
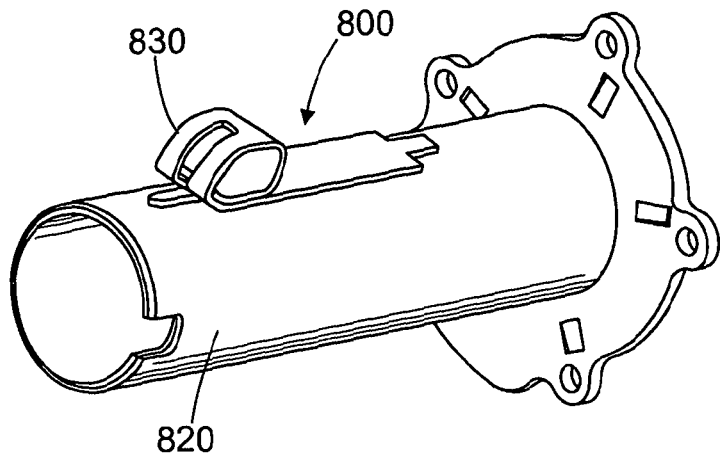
FIG. 18 is a view showing the location of the energy absorbing member when attached to the inner tube.
Figure 16:
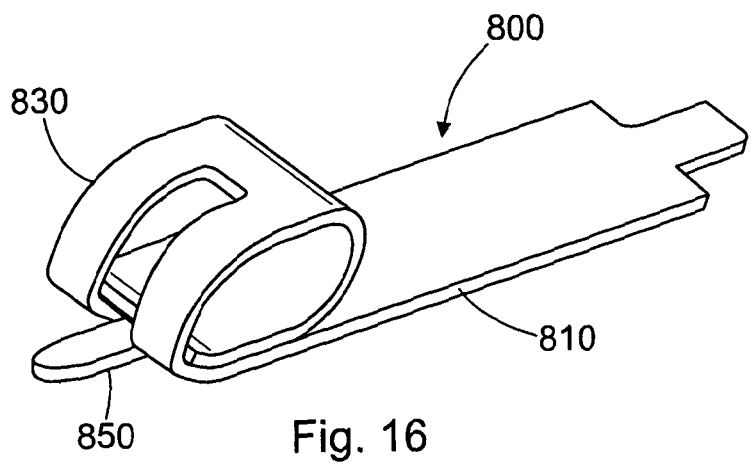
FIGS. 16 and 17 are alternative isometric views of an alternative energy absorbing member.
Figure 17:
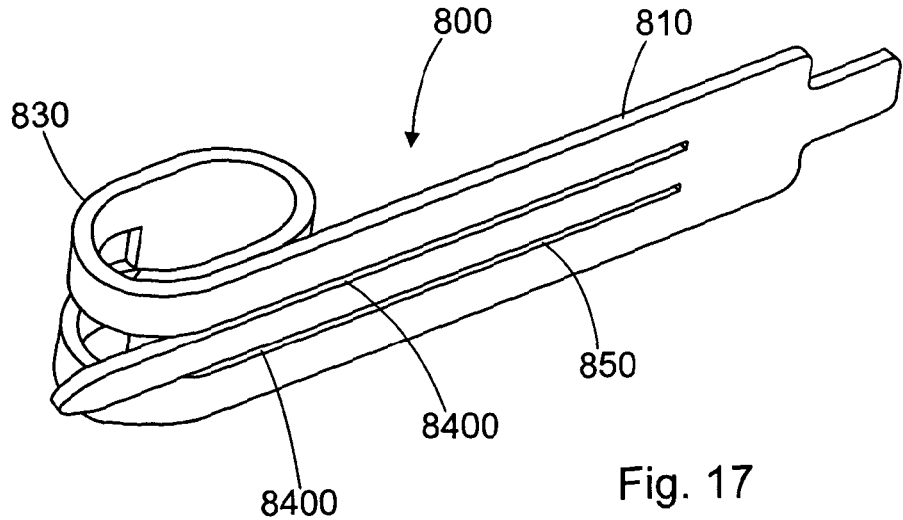

FIGS. 16 and 17 illustrate and alternative arrangement which is functionally the same as FIGS. 12 and 13 apart from the loop and energy absorbing strap being a part of a different form of energy absorbing member 800 that is secured to the inner tube 800 by welds or rivets, or a combination of both or any other suitable fastening arrangement. The member 800 comprises a base plate 810, which is secured to the inner tube 820. A closed loop 830 is provided at one end which is sized so that the clamp bolt can pass through the loop. The loop 820 joins to the base plate 810 at one end of the base plate 810. Two parallel grooves 840a, 840b are provided in the base plate, which each have one end a small distance from the point where loop joins the base plate 810, and extend along the length of the base plate. The grooves 840a, 840b define a strap 850 of material therebetween which forms the energy absorbing strap, the strap deforming as the loop 830 is pulled back along the base by the clamp bolt during a crash, whilst the strap tears away along the weakenings formed by the grooves. The bending and tearing together help absorb the energy of the crash. FIG. 18 shows how the base plate is secured to the inner tube 820.

The slits 840a, 840b may instead of grooves be perforated lines similar to those shown in FIGS. 14 and 15, or other weakenings. They may even be continuous slots, although in that case the only energy absorption will be as a result of the strap being deformed.

Figure 19:
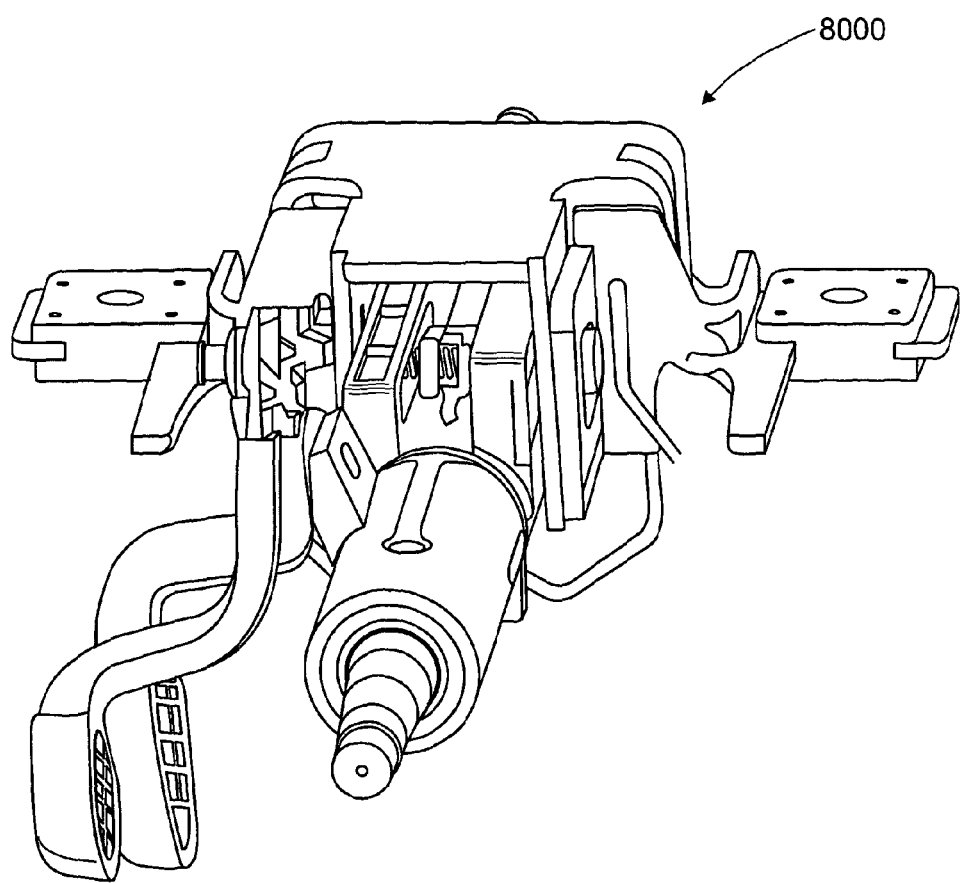
FIG. 19 is an isometric view of a further embodiment of an adjustable steering column assembly which falls within the scope of the invention which includes the energy absorbing member of FIGS. 16 and 17.

In use, the loop 830 passes around the clamp bolt just as the loop 620 does in the embodiment of FIG. 12. All other parts of the steering column assembly may be same as those shown in FIG. 12, and it may function in the same manner as that embodiment. An embodiment of an adjustable steering column assembly 8000 incorporating this energy absorbing member is shown in FIG. 19 of the drawings In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column assembly which includes a first shroud portion comprising an outer tube, a second shroud portion which comprises an inner tube, and a clamp assembly that includes a part that is fixed relative to the outer tube, the first shroud portion and the second shroud portion being releasably engaged by a clamp assembly to selectively permit an amount of relative movement between the first and the second shroud portion that is required during adjustment of the steering column assembly, the steering column assembly further including an energy absorbing member which includes a strap that interconnects the inner tube and a part of the clamp assembly, the adjustable steering column assembly being so arranged that upon collapse the inner tube moves relative to the clamp assembly whereupon the energy absorbing member is deformed beyond its elastic limit, thereby absorbing energy in the assembly to control the collapse of the adjustable steering column-assembly and further in which the clamp assembly is fixed relative to the outer tube portion when the clamp assembly is both in a clamped condition and a released condition which prevents the first shroud portion and the second shroud portion from sliding apart should the clamp assembly be inadvertently moved to the released position.

2. An adjustable steering column assembly according to claim 1 in which the outer tube includes an axial slot which is so positioned that the when clamped partially closes the slot to squeeze the outer tube onto the inner tube, and the strap of the energy absorbing member is at least partially located within this slot.

3. An adjustable steering column according to claim 2 in which the energy absorbing member is located in the slot of the outer tube so that it abuts one edge of the slot.

4. An adjustable steering column assembly according to claim 1 in which the clamp assembly comprises a clamp bracket having two spaced arms, and a clamp bolt which passes through openings in each arm and the energy absorbing member engages the bolt or a sleeve surrounding a part of the bolt.

5. An adjustable steering column assembly according to claim 1 which is of the inverted-type, whereby the inner tube is fixed axially relative to the rake bracket during normal use whilst the outer tube moves telescopically to provide for reach adjustment of the assembly, the inner tube moving axially in the event of a crash.

6. An adjustable steering column assembly according to claim 4 in which the energy absorbing member comprises a strap that connects the inner tube to the clamp bolt, the strap being provided with a loop at one end which engages the clamp bolt, and being secured to the inner tube at its other end so that in use, during a crash, the loop will be pulled by the clamp bolt causing the strap to deform and absorb energy.

7. An adjustable steering column assembly according to claim 6 in which the strap is located within a frame and connected along its length to the frame by weakening lines which comprise slots or comprise regions of substantially reduced thickness relative to the central portion.

8. An adjustable steering column assembly according to claim 1 in which the energy absorbing member is an integral part of the inner tube.

9. An adjustable steering column assembly according to claim 4 in which the energy absorbing member comprises a strap that is secured to the inner tube at one or both ends, the strap being formed into a 360 degree loop with the centre of the loop coincident with the axis of the clamp bolt so that on collapse the clamp bolt moves away from the steering wheel so as to force the strap to curl and uncurl around the clamp bolt, moving the loop along the strap towards the end of the strap furthest from the steering wheel.

10. An adjustable steering column assembly which includes a first shroud portion comprising an outer tube, a second shroud portion which comprises an inner tube, and a clamp assembly that includes a part that is fixed relative to the outer tube, the first and the second shroud portion being releasably engaged by a clamp assembly to selectively permit an amount of relative movement between the first shroud portion and the second shroud portion that is required during adjustment of the steering column assembly, the steering column assembly further including an energy absorbing member which includes a strap that interconnects the inner tube and a part of the clamp assembly, the assembly being so arranged that upon collapse the inner tube moves relative to the clamp assembly whereupon the energy absorbing member is deformed beyond its elastic limit, thereby absorbing energy in the system to control the collapse of the assembly and in which the outer tube includes an axial slot which is so positioned that the clamp assembly when clamped partially closes the slot to squeeze the outer tube onto the inner tube, the strap of the energy absorbing member being at least partially located within this slot so that it abuts one edge of the slot to provide an anti-rotation feature.

11. An adjustable steering column assembly according to claim 10 in which the clamp assembly is fixed relative to the outer tube portion when the clamp assembly is both the clamped and the released condition.

12. An adjustable steering column assembly according to claim 10 in which the clamp assembly comprises a clamp bracket having two spaced arms, and a clamp bolt which passes through openings in each arm and the energy absorbing member may engage the bolt or a sleeve surrounding a part of the bolt.

13. An adjustable steering column assembly according to claim 10 which is of the inverted-type, whereby the inner tube is fixed axially relative to the rake bracket during normal use whilst the outer tube moves telescopically to provide for reach adjustment of the assembly, the inner tube moving axially in the event of a crash.

14. An adjustable steering column assembly according to claim 1 in which the energy absorbing member comprises a strap that connects the inner tube to the clamp bolt, the strap being provided with a loop at one end which engages the clamp bolt, and being secured to the inner tube at its other end so that in use, during a crash, the loop will be pulled by the clamp bolt causing the strap to deform and absorb energy.

15. An adjustable steering column assembly according to claim 12 in which the energy absorbing member comprises a strap that is secured to the inner tube at one or both ends, the strap being formed into a 360 degree loop with the centre of the loop coincident with the axis of the clamp bolt so that on collapse the clamp bolt moves away from the steering wheel so as to force the strap to curl and uncurl around the clamp bolt, moving the loop along the strap towards the end of the strap furthest from the steering wheel.

16. An adjustable steering column assembly which includes a first shroud portion comprising an outer tube, a second shroud portion which comprises an inner tube, and a clamp assembly that includes a part that is fixed relative to the outer tube, the first and second shroud portions being releasably engaged by the clamp assembly to selectively permit an amount of relative movement between the first and second shroud portions that is required during adjustment of the steering column assembly, the assembly further including a strap that interconnects the inner tube and the part of the clamp bolt assembly, the assembly being so arranged that upon collapse the inner tube moves relative to the whereupon the strap causes a portion of the inner tube to be torn away, thereby absorbing energy in the system to control the collapse of the assembly.

17. An adjustable steering column assembly according to claim 16 in which the strap comprises an integral part of the inner tube, for instance it may be formed by making a cut-out in the inner tube wall to define a tab which is folded back out of the plane of the inner tube.

18. An adjustable steering column assembly according to claim 17 in which the strap is fixed to the inner tube by a weld or rivet or the like.

19. An adjustable steering column assembly according to claim 17 in which the strap includes a loop through which a clamp bolt of the is passed.

20. An adjustable steering column assembly which includes a first shroud portion comprising an outer tube, a second shroud portion which comprises an inner tube, and a that includes a part that is fixed relative to the outer tube, the first shroud portion and the second shroud portion being releasably engaged by the to selectively permit an amount of relative movement between the first shroud portion and the second shroud portion that is required during adjustment of the steering column assembly, the assembly further including an energy absorbing member which includes a strap that interconnects the inner tube and the part of the clamp bolt assembly, the assembly being so arranged that upon collapse the inner tube moves relative to the whereupon the energy absorbing member is deformed beyond its elastic limit, thereby absorbing energy in the system to control the collapse of the assembly.

21. An adjustable steering column assembly according to claim 20 in which the clamp assembly is fixed relative to the outer tube portion when the clamp assembly is both the clamped and the released condition.

22. An adjustable steering column assembly according to claim 20 in which the outer tube includes an axial slot which is so positioned that the when clamped partially closes the slot to squeeze the outer tube onto the inner tube, and the strap of the energy absorbing member is at least partially located within this slot.

23. An adjustable steering column according to claim 22 in which the energy absorbing member is located in the slot of the outer tube so that it abuts one edge of the slot.

24. An adjustable steering column assembly according to claim 20 in which the clamp assembly comprises a clamp bracket having two spaced arms, and a clamp bolt which passes through openings in each arm and the energy absorbing member may engage the bolt or a sleeve surrounding a part of the bolt.

25. An adjustable steering column assembly according to claim 20 which is of the inverted-type, whereby the inner tube is fixed axially relative to the rake bracket during normal use whilst the outer tube moves telescopically to provide for reach adjustment of the assembly, the inner tube moving axially in the event of a crash.

26. An adjustable steering column assembly according to claim 24 in which the energy absorbing member comprises a strap that connects the inner tube to the clamp bolt, the strap being provided with a loop at one end which engages the clamp bolt, and being secured to the inner tube at its other end so that in use, during a crash, the loop will be pulled by the clamp bolt causing the strap to deform and absorb energy.

27. An adjustable steering column assembly according to claim 26 in which the strap is located within a frame and connected along its length to the frame by weakening lines which comprise slots or comprise regions of substantially reduced thickness relative to the central portion.

28. An adjustable steering column assembly according to claim 20 in which the energy absorbing member is an integral part of the inner tube.

29. An adjustable steering column assembly according to claim 24 in which the energy absorbing member comprises a strap that is secured to the inner tube at one or both ends, the strap being formed into a 360 degree loop with the centre of the loop coincident with the axis of the clamp bolt so that on collapse the clamp bolt moves away from the steering wheel so as to force the strap to curl and uncurl around the clamp bolt, moving the loop along the strap towards the end of the strap furthest from the steering wheel.

* * * * *

UNITED STATES PATENT AND TRADEMARK OFFICE
CERTIFICATE OF CORRECTION

PATENT NO. : 8,632,098 B2
APPLICATION NO. : 13/514674
DATED : January 21, 2014
INVENTOR(S) : Niclas Davies et al.

Page 1 of 1

It is certified that error appears in the above-identified patent and that said Letters Patent is hereby corrected as shown below:

In the Claims

Column 13, line 21, claim 20, before "that", insert --clamp assembly--.

Column 13, line 23, claim 20, after "the", insert --clamp assembly--.

Signed and Sealed this
Ninth Day of September, 2014

Michelle K. Lee
*Deputy Director of the United States Patent and Trademark Office*